US007680851B2

(12) United States Patent
Liu et al.

(10) Patent No.: US 7,680,851 B2
(45) Date of Patent: Mar. 16, 2010

(54) ACTIVE SPAM TESTING SYSTEM

(75) Inventors: Tie-Yan Liu, Beijing (CN); Hang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 233 days.

(21) Appl. No.: 11/682,971

(22) Filed: Mar. 7, 2007

(65) Prior Publication Data

US 2008/0222451 A1    Sep. 11, 2008

(51) Int. Cl.
*G06F 17/30* (2006.01)
(52) U.S. Cl. ......................... 707/706; 717/124
(58) Field of Classification Search .......... None
See application file for complete search history.

(56) References Cited

U.S. PATENT DOCUMENTS

| | | | | |
|---|---|---|---|---|
| 6,023,773 | A * | 2/2000 | O'Donnell et al. | 714/40 |
| 6,339,784 | B1 | 1/2002 | Morris et al. | |
| 6,408,403 | B1 * | 6/2002 | Rodrigues et al. | 714/38 |
| 7,072,888 | B1 | 7/2006 | Perkins et al. | |
| 7,089,252 | B2 | 8/2006 | Tomlin et al. | |
| 7,243,137 | B2 * | 7/2007 | Zhang et al. | 709/219 |
| 2003/0195937 | A1 | 10/2003 | Kircher et al. | |
| 2006/0031373 | A1 | 2/2006 | Werner et al. | |
| 2006/0036598 | A1 | 2/2006 | Wu | |
| 2006/0069667 | A1 | 3/2006 | Manasse et al. | |
| 2006/0095416 | A1 | 5/2006 | Barkhin et al. | |
| 2006/0184500 | A1 | 8/2006 | Najork et al. | |
| 2007/0234217 | A1 * | 10/2007 | Miller et al. | 715/738 |

OTHER PUBLICATIONS

Franklin, How Search Engines Work, 2005, p. 1-2.*
Wu, Identifying Link Farm Spam Pages, 2005, pp. 1-10.*
Galileo, The Scientific Method, 1642, p. 1.*
Ousterhout, Scripting: Higher Level Programming for the 21st Century, 1998, pp. 1, 5, 7.*
Hawking, Measuring Search Engine Quality, 2001, pp. 35, 39, and 40.*
Wudka, What is the Scientific Method, 1998, p. 1.*
Desikan, Incremental Page Rank Computation on Evolving Graphs. May 2005. pp. 1-9.*
Patton, Software Testing, 2nd Edition, Jul. 26, 2005, p. 1-8.*
Castillo, A Reference Collection for Web Spam, ACM SIGIR Forum, vol. 40 No. 2, Dec. 2006, pp. 11-24.*
Hawking, Measuring Search Engine Quality, Information Retrieval, 4, 2001, pp. 33-59.*

(Continued)

*Primary Examiner*—James Trujillo
*Assistant Examiner*—Albert Phillips
(74) *Attorney, Agent, or Firm*—Perkins Coie LLP

(57) ABSTRACT

A method and system for introducing spam into a search engine for testing purposes is provided. An active spam testing system receives from a tester a specification of spam that is to be introduced into the search engine for testing purposes. The testing system may then generate auxiliary data structures for storing indications of the spam that is to be introduced. A search engine has original data structures that may include a content index and a link data structure. The testing system stores the indications of the spam in the auxiliary data structures so that use of the search engine for non-testing purposes is not affected. When the search engine is used for testing purposes, the search engine generates search results based on a combination of the original data structures and the auxiliary data structures.

12 Claims, 7 Drawing Sheets

OTHER PUBLICATIONS

Gyongyi, Combating Web Spam with TrustRank, Proceedings of the 30$^{th}$ VLDB Conference, 2004, pp. 576-587.*

Evans, Using the Web Graph to influence application behaviour, Internet Research, 2004, pp. 372-378.*

Bernot, Testing Against Formal Specifications: A theoretical view, Proceedings of the international joint conference on theory and practice of software development on Advances in distributed computing (ADC) and colloquium on combining paradigms for software development (CCPSD): vol. 2, 1991, pp. 1-18 (99-119).*

Benczur, Andras A., "Link-Based Similarity Search to Fight Web Spam," AIRWEB'06, Aug. 10, 2006, Seattle, Washington, USA.

Desikan, Prasanna et al., "Incremental Page Rank Computation on Evolving Graphs," WWW 2005, May 10-14, 2005, Chiba, Japan, ACM, pp. 21:5-21:6.

Gyongyi, Zoltan et al., "Combating Web Spam with TrustRank," Proceedings of the 30th VLDB Conference, Toronto, Canada, 2004, pp. 576-587.

Wu, Baoning et al., "Topical TrustRank: Using Topicality to Combat Web Spam," WWW 2006, May 23-26, 2006, Edinburgh, Scotland, ACM, pp. 63-72.

* cited by examiner

ACTIVE SPAM TESTING SYSTEM

BACKGROUND

Many search engine services, such as Google and Overture, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

Three well-known techniques for page ranking are PageRank, HITS ("Hyperlink-Induced Topic Search"), and DirectHIT. PageRank is based on the principle that web pages will have links to (i.e., "out links") important web pages. Thus, the importance of a web page is based on the number and importance of other web pages that link to that web page (i.e., "in links"). In a simple form, the links between web pages can be represented by adjacency matrix A, where $A_{ij}$ represents the number of out links from web page i to web page j. The importance score $w_j$ for web page j can be represented by the following equation:

$$w_j = \sum_i A_{ij} w_i$$

This equation can be solved by iterative calculations based on the following equation:

$$A^T w = w$$

where w is the vector of importance scores for the web pages and is the principal eigenvector of $A^T$.

The HITS technique is additionally based on the principle that a web page that has many links to other important web pages may itself be important. Thus, HITS divides "importance" of web pages into two related attributes: "hub" and "authority." "Hub" is measured by the "authority" score of the web pages that a web page links to, and "authority" is measured by the "hub" score of the web pages that link to the web page. In contrast to PageRank, which calculates the importance of web pages independently from the query, HITS calculates importance based on the web pages of the result and web pages that are related to the web pages of the result by following in links and out links. HITS submits a query to a search engine service and uses the web pages of the result as the initial set of web pages. HITS adds to the set those web pages that are the destinations of in links and those web pages that are the sources of out links of the web pages of the result. HITS then calculates the authority and hub score of each web page using an iterative algorithm. The authority and hub scores can be represented by the following equations:

$$a(p) = \sum_{q \to p} h(q) \text{ and } h(p) = \sum_{p \to q} a(q)$$

where a(p) represents the authority score for web page p and h(p) represents the hub score for web page p. HITS uses an adjacency matrix A to represent the links. The adjacency matrix is represented by the following equation:

$$b_{ij} = \begin{cases} 1 & \text{if page } i \text{ has a link to page } j, \\ 0 & \text{otherwise} \end{cases}$$

The vectors a and h correspond to the authority and hub scores, respectively, of all web pages in the set and can be represented by the following equations:

$$a = A^T h \text{ and } h = Aa$$

Thus, a and h are eigenvectors of matrices $A^T A$ and $AA^T$. HITS may also be modified to factor in the popularity of a web page as measured by the number of visits. Based on an analysis of click-through data, $b_{ij}$ of the adjacency matrix can be increased whenever a user travels from web page i to web page j.

Although these techniques for ranking web pages based on analysis of links can be very useful, these techniques are susceptible to spamming, both "link spamming" and to some extent "content spamming." "Spamming" in general refers to a deliberate action taken to unjustifiably increase the rank, relevance, popularity, importance, and so on of a web page or web site. In the case of link spamming, a spammer can manipulate links to unjustifiably increase the importance of a web page. For example, a spammer may increase a web page's hub score by adding out links to the spammer's web page. A common technique for adding out links is to create a copy of an existing link directory to quickly create a very large out link structure. As another example, a spammer may provide a web page of useful information with hidden links to spam web pages. When many web pages point to the useful information, the importance of the spam web pages is indirectly increased. As another example, many web sites, such as blogs and web directories, allow visitors to post links. Spammers can post links to their spam web pages to directly or indirectly increase the importance of the spam web pages. As another example, a group of spammers may set up a link exchange mechanism in which their web sites point to each other to increase the importance of the web pages of the spammers' web sites.

In the case of content spamming, a spammer may create a web page with content that is deliberately added in an attempt to increase the relevance of the web page to certain queries. For example, a web page for a banking service may have hidden data or metadata with the terms "home loans," "low-cost mortgages," "no closing costs," "no points," "home line of credit," and so on. The spammer is hoping that the web page will have its relevance increase for queries that relate to home mortgages because of the spam content that has been added. The spam content can be added to any web page of the banking service. For example, the spam "no closing costs"

may be added as hidden text to web pages for mortgages that indeed have some closing costs.

Web spam presents problems for various techniques that rely on web data. For example, a search engine service that orders search results in part based on relevance, popularity, or importance of web pages may rank spam web pages unjustifiably high because of the spamming. As another example, a web crawler may spend valuable time crawling the links of spam web sites, which increases the overall cost of web crawling and may reduce its effectiveness. Some techniques have been developed to try to combat spamming. It has, however, been difficult to test the effectiveness of these anti-spamming techniques. First, since the developers of an anti-spamming technique typically provide a search engine service, the developers do not want to intentionally add spam to web pages. In particular, the spam that is introduced for testing purposes may negatively affect the quality of search results provided by their search engine for non-testing purposes. Assuming that the anti-spamming technique is as effective as hoped, then this would not be a problem. However, if the technique is not particularly effective, then the search results for non-testing purposes would be negatively affected by the spam introduced for testing purposes. Second, since it is a time-consuming process to crawl the billions of web pages and generate the various data structures (e.g., content index and web graph and importance scores) used by a search engine, search engine services typically regenerate the data structures only infrequently. As a result, the speed of testing of anti-spamming techniques is constrained by the infrequent updating of the data structures. Third, the developers of anti-spamming techniques typically have to wait until spammers introduce new spam to develop an appropriate anti-spamming technique. Although a developer could proactively introduce spam using a new spamming technique and try to develop an appropriate anti-spamming technique, the introduced spam would negatively affect non-testing search results, and the testing would be slowed by the infrequent updating of the data structures of a search engine.

SUMMARY

A method and system for introducing spam into a search engine for testing purposes is provided. An active spam testing system receives from a tester a specification of spam that is to be introduced into the search engine for testing purposes. The testing system may then generate auxiliary data structures for storing indications of the spam that is to be introduced. A search engine has original data structures that may include a content index and a link data structure. The testing system stores the indications of the spam in the auxiliary data structures so that use of the search engine for non-testing purposes is not affected. When the search engine is used for testing purposes, the search engine generates search results based on a combination of the original data structures and the auxiliary data structures. Because the testing system represents the spam in the auxiliary data structures, a tester can introduce spam for testing purposes independently of when the search engine regenerates its original data structures. Since the search engine for non-testing purposes uses only the original data structures, the search engine service generates search results that are not affected by the introduced spam.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
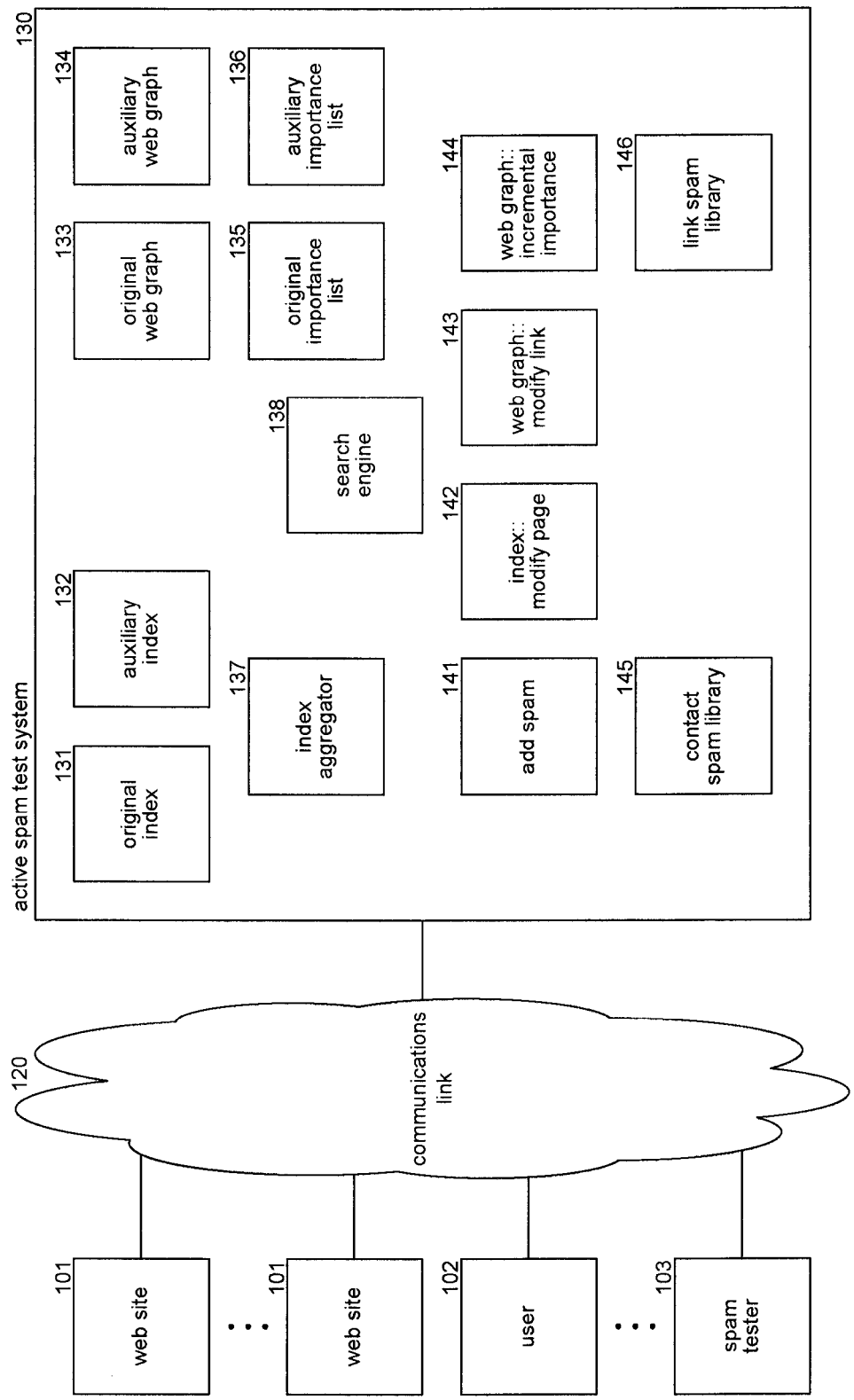
FIG. 1 is a block diagram that illustrates components of the active spam test system in one embodiment.

A method and system for introducing spam into a search engine for testing purposes is provided. In one embodiment, an active spam testing system receives from a tester a specification of spam that is to be introduced into the search engine for testing purposes. For example, the spam that is to be introduced may include content spam, such as a new web page with terms intended to unjustifiably increase the relevance of the web page to certain queries, and may include link spam, such as adding links to other web pages that point to the new web page to unjustifiably increase the importance of the new web page. The testing system may then generate auxiliary data structures for storing indications of the spam that is to be introduced. A search engine has original data structures that may include a content index and a link data structure. The testing system stores the indications of the spam in the auxiliary data structures so that use of the search engine for non-testing purposes is not affected. When the search engine is used for testing purposes, the search engine generates search results based on a combination of the original data structures and the auxiliary data structures. When the search engine is used for non-testing purposes, the search engine generates results based only on the original data structures. Because the testing system represents the spam in the auxiliary data structures, a tester can introduce spam for testing purposes independently of when the search engine regenerates its original data structures. In addition, since the search engine for non-testing purposes uses only the original data structures, the search engine service generates search results that are not affected by the introduced spam. In this way, a tester can actively introduce spam based on new spamming techniques so that effective anti-spamming techniques can be developed even before spammers can introduce the same new spamming techniques.

In one embodiment, the active spam testing system allows a user to introduce content spam that is represented in an auxiliary content index. The auxiliary content index includes a mapping of terms to the web pages that contain those terms. The specification of content spam may include the URL of a web page, the title of the web page, and the content of the web page. To add the specification to the auxiliary content index, the testing system first determines whether an entry has already been created for that web page in a web page table. If not, the testing system creates an entry for that web page with the specified title in the web page table. The testing system then generates a mapping from each term of the specified content to the web page. The auxiliary content index may include a term table with an entry for each term that contains the indexes of the web pages in the web page table that contains that term. When a search is conducted for testing purposes, an index aggregator searches both the original content index and the auxiliary content index to identify relevant web pages. The index aggregator then presents to the search engine an aggregation of the web pages identified from both content indexes. The search engine can then rank the search results according to a conventional ranking algorithm. The search engine when used in test mode can invoke various anti-spamming techniques that are to be tested. The developer of an anti-spamming technique can then analyze the search results generated based on the introduced spam to evaluate the effectiveness of the anti-spamming technique.

In one embodiment, the active spam testing system allows a user to introduce link spam that is represented in an auxiliary link data structure that includes an auxiliary web graph and an auxiliary importance list. The auxiliary web graph may be represented as a matrix with a row and a column for each web page of the entire web. Each entry in the matrix may indicate whether link spam has been introduced as a link from one web page of the entry to the other web page of the entry. The auxiliary importance list contains an entry for each web page of the web that contains a score indicating the importance of the web page. The specification of a link spam includes an indication of a link between a source web page that contains the link and a target web page to which the link points. If the auxiliary web graph does not contain an entry for one of the web pages, the test system adds a corresponding row and column to the auxiliary web graph. The test system updates the entry for the source web page and the target web page to indicate the link between the web pages. The test system then generates new importance scores for all the web pages using various techniques such as the incremental technique described in Desikan, P., Pathak, N., Srivastava, J., and Kumar, V., "Incremental Page Rank Computation on Evolving Graphs," WWW 2005, Chiba, Japan, May 10-14, 2005, pp. 1094-95 and described in Desikan, P., Pathak, N., Srivastava, J., and Kumar, V., "Incremental Page Rank Computation on Evolving Graphs," AHPCRC Technical Report 2004-195. The incremental technique, as described below in more detail, identifies all web pages that are reachable by the introduced link spam. The incremental technique then recalculates the importance score (e.g., PageRank score) for those web pages and scales the importance scores for those web pages that are not reachable. Because the test system only calculates importance scores to the reachable web pages, rather than all web pages, the importance scores can effectively and efficiently factor in the introduced link spam. When a search is conducted for non-testing purposes, the search engine uses an original importance list when ranking search results. In contrast, when a search is conducted for testing purposes, the search engine uses the auxiliary importance list when ranking the results of the search. The search engine when testing can invoke various anti-spamming techniques that are to be tested. The developer of an anti-spamming technique can then analyze the search results to evaluate the effectiveness of the anti-spamming technique.

In one embodiment, the test system allows a tester to specify content spam and link spam using a script with instructions for modifying the content index and the web graph. The script may allow conventional programming language statements such as looping statements, assignment statements, function invocation statements, and so on. The test system may provide an application programming interface ("API") through which a tester can modify the content index and the web graph. The application programming interface has functions for adding content spam and link spam. For example, the application programming interface has a function to add a new web page to the content index. The function inputs the URL of the web page, the title of the web page, and the content of the web page and updates the auxiliary content index as appropriate. The application programming interface also has a function to add a new link to the web graph. The function inputs the URL of the source web page, the URL of the target web page, and anchor text for the link on the source web page. The function updates the auxiliary web graph as appropriate. The application program interface may also have a function to incrementally regenerate the importance scores of the web pages. The function generates a new auxiliary importance list using the incremental technique as described above.

TABLE 1

1. int farmsize = 100;
2. char *anchor_list[4] = {"spambox", "test spam", "random anchor", "test"};
3. Index.ModifyPage("http://test.spam/", "test", "nasa spam test");
4. for (int i = 1; i < farmsize; i++);
5. {
6.   char url[128];
7.   sprintf(url, "http://test_spam_%d.htm", rand( ));
8.   WebGraph.ModifyLink(url, "http://test.spam/", anchor_list[rand( )%4]);
9. }
10. WebGraph.IncrementalImportance("http://test.spam/");

Table 1 illustrates an example script in one embodiment. This example script generates a star-structured link farm. A star-structured link farm contains many web pages that each contain a link to a target web page. Various other types of link farms can be introduced such as a completely connected link farm in which each web page has a link to each other web page of the farm. In line 1, the script initializes the number of web pages of the farm. In line 2, the script initializes a list of anchor text to contain four possible values. In line 3, the script invokes a modify page function to add a web page with the URL of "http://test.spam/," the title of "test," and the content of "nasa spam test" as introduced spam. This function adds a web page to the auxiliary index content. In lines 4-9, the script loops adding a link from each source web page to the target web page. In line 7, the script generates a new URL for a source web page. In line 8, the script invokes the modified link function to add a link from the web page of the newly generated URL to the target web page of the star-structured link farm. In line 10, after the link farm has been created, the script invokes the incremental importance function to incrementally regenerate the importance of the web pages.

FIG. 1 is a block diagram that illustrates components of the active spam test system in one embodiment. The active spam test system 130 is connected to web sites 101, user computing devices 102, and spam tester computing devices 103 via a communications link 120. The active spam test system includes an original index store 131, an auxiliary index store 132, an original web graph store 133, an auxiliary web graph store 134, an original importance list store 135, an auxiliary importance list store 136, an index aggregator component 137, and a search engine component 138. Each of the data stores contains original information or auxiliary information as described above. The search engine component invokes the index aggregator component to identify web pages relevant to a query based on the aggregate information of the original index and the auxiliary index. The search engine, when in test mode, ranks search results using the auxiliary importance list. The active spam test system also includes an add spam component 141, a modify page component 142, a modify link component 143, and an incremental importance component 144. The modify page component may be a function of an API provided for introducing spam into the content index. The modify link component is provided by an API for introducing link spam into the web graph. The incremental importance component calculates the importance score for the auxiliary importance list using an incremental technique. The active spam test system may also include a content spam library 145 and a link spam library 146. These libraries may contain standard functions for introducing well-known spam that can be used by various testers. For example, the link spam library may have a script to generate a fully connected link farm of the size specified by an input parameter.

The computing device on which the active spam test system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the test system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the test system may be implemented in various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The test system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, a separate computing system may crawl the web and generate the original content index and web graph. Also, the search engine may be hosted on a separate computing system.

Figure 2:
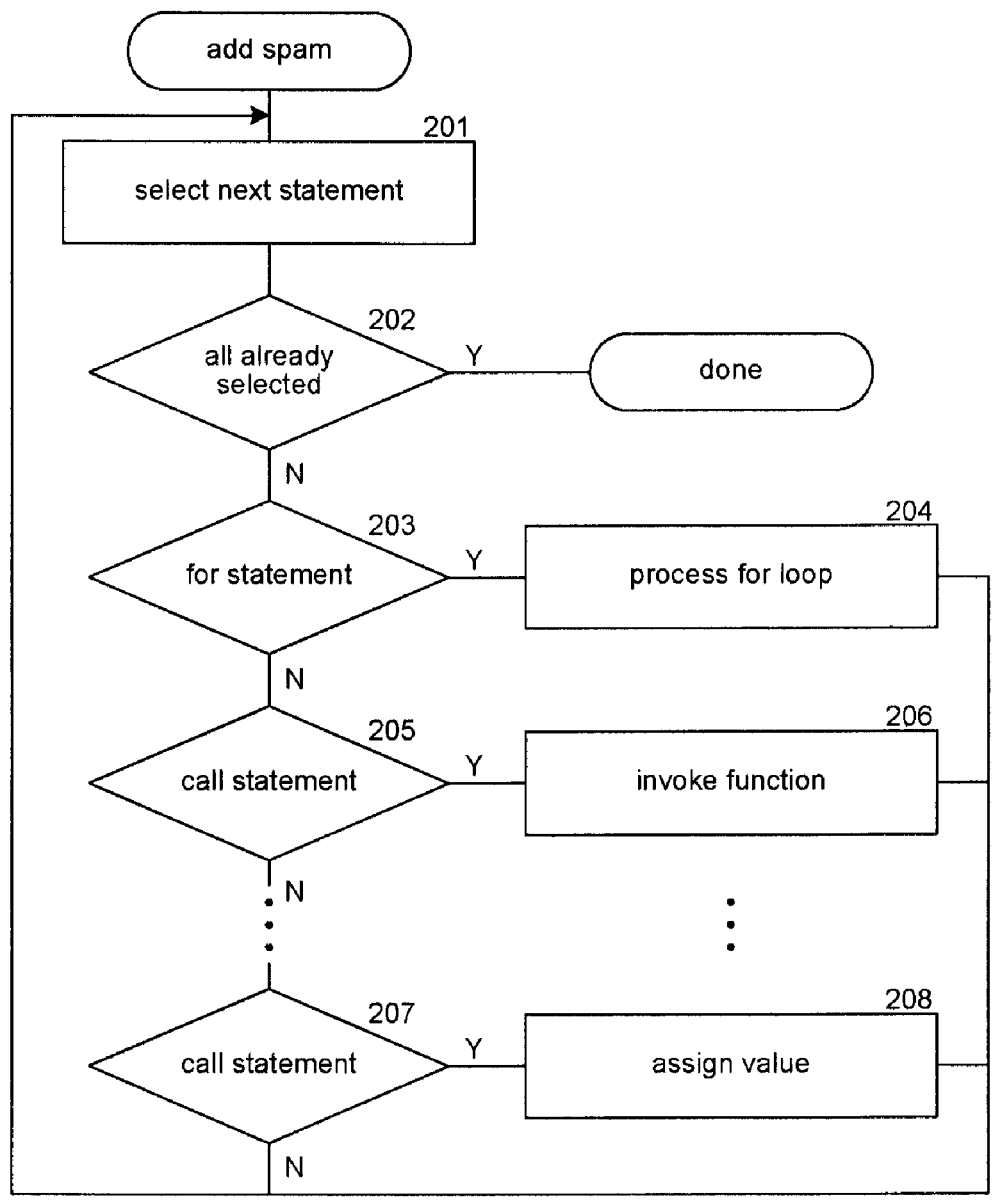
FIG. 2 is a flow diagram that illustrates the processing of the add spam component of the test system in one embodiment.

FIG. 2 is a flow diagram that illustrates the processing of the add spam component of the test system in one embodiment. The component inputs a script specifying content spam and link spam and processes the script to introduce the spam into the auxiliary data structures. In block 201, the component selects the next statement of the script. In decision block 202, if all the statements have already been selected, then the component completes, else the component continues at block 203. In blocks 203, 205, and 207, the component determines the type of selected statement and performs the appropriate processing for that type of statement in blocks 204, 206, and 208. For example, in decision block 203, if the selected statement is a for statement, then the component performs the processing for a for loop such as the for loop indicated by lines 4-9 of Table 1. The component then loops to block 201 to select the next statement. One skilled in the art will appreciate that the scripting language may be defined to be a subset of the statements of a conventional programming language such as C# and Basic. The scripting language may be a conventional programming language that is compiled into executable code, rather than being interpreted at runtime.

Figure 3:
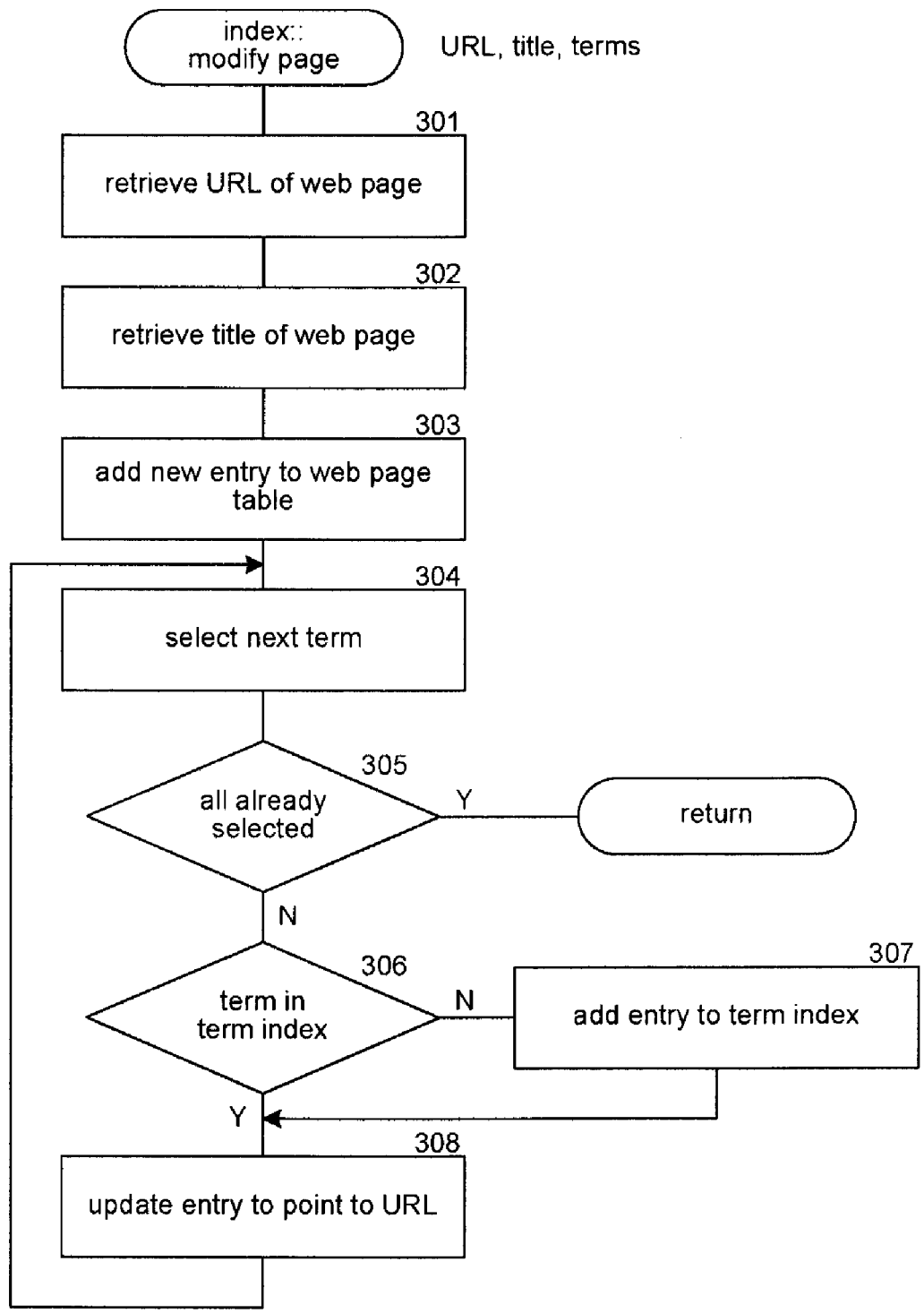
FIG. 3 is a flow diagram that illustrates the processing of the modify page component of the test system in one embodiment.

FIG. 3 is a flow diagram that illustrates the processing of the modify page component of the test system in one embodiment. The component is passed a URL of a web page, the title of the web page, and terms within the content of the web page. The component updates the auxiliary index to map the terms to the web page. In block 301, the component retrieves the URL of the web page. In block 302, the component retrieves the title of the web page. In block 303, the component adds a new entry to the web page table of the auxiliary index. In blocks 304-308, the component loops updating the mappings of the terms to the new web page. In block 304, the component selects the next term. In decision block 305, if all the terms have already been selected, then the component returns, else the component continues at block 306. In decision block 306, if the term is already in the term index, then the component continues at block 308, else the component continues at block 307. In block 307, the component adds an entry to the term index for the selected term. In block 308, the component updates the entry for the selected term to point to the URL of the web page being added and then loops to block 304 to select the next page.

Figure 4:
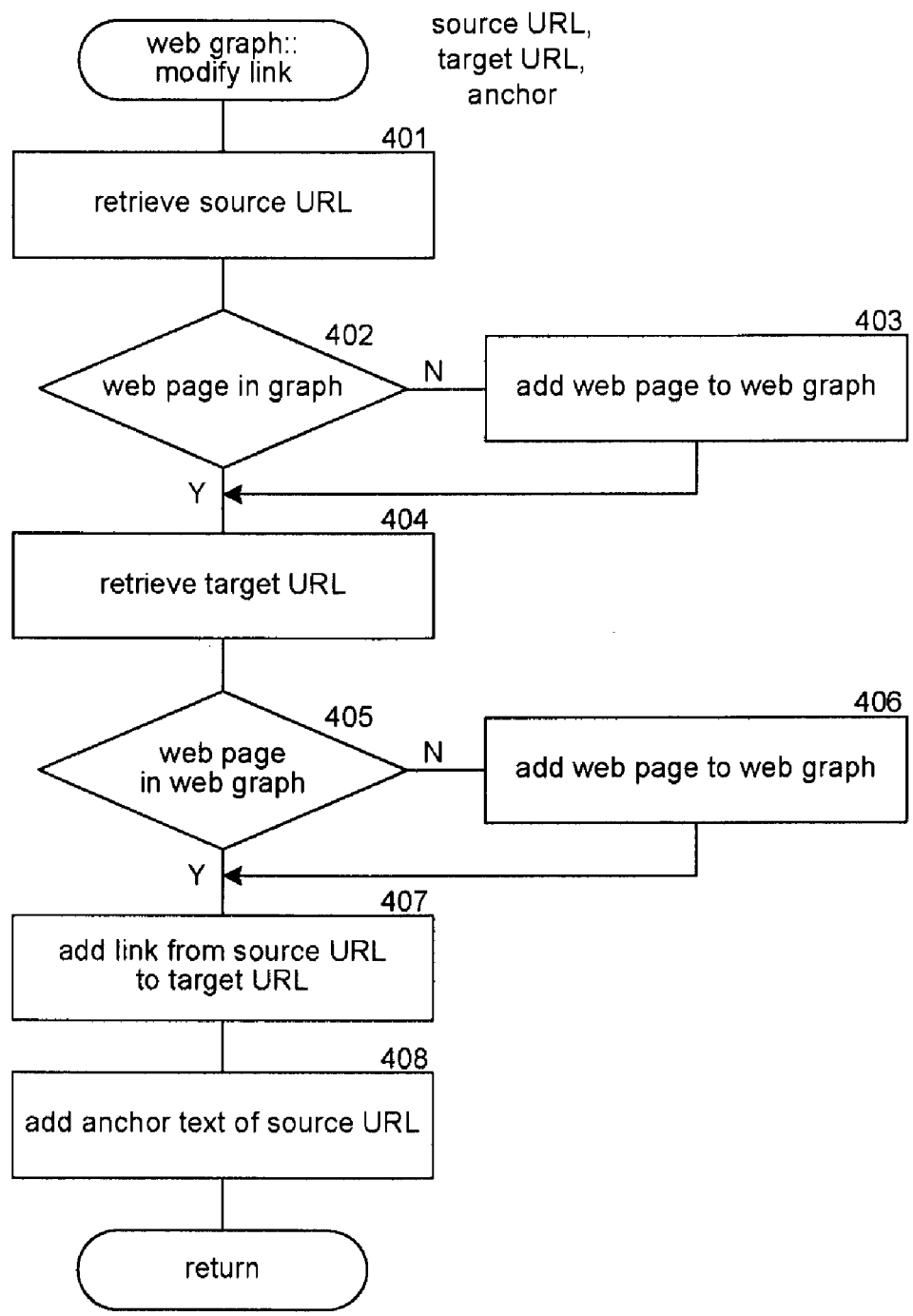
FIG. 4 is a flow diagram that illustrates the processing of the modify link component of the test system in one embodiment.

FIG. 4 is a flow diagram that illustrates the processing of the modify link component of the test system in one embodiment. The component is passed the URL of a source web page, the URL of a target web page, and anchor text. The component updates the auxiliary web graph to indicate the link of the source web page to the target web page. In block 401, the component retrieves the URL of the source web page. In decision block 402, if the source web page is already in the web graph, then the component continues at block 404, else the component adds the source web page to the web graph in block 403. In block 404, the component retrieves the URL of the target web page. In decision block 405, if the target web page is already in the web graph, then the component continues at block 407, else the component adds the web page corresponding to the target URL to the web graph in block 406. In block 407, the component adds a link from the source web page to the target web page in the auxiliary web graph. In block 408, the component adds the anchor text of the source web page and then returns.

Figure 5:
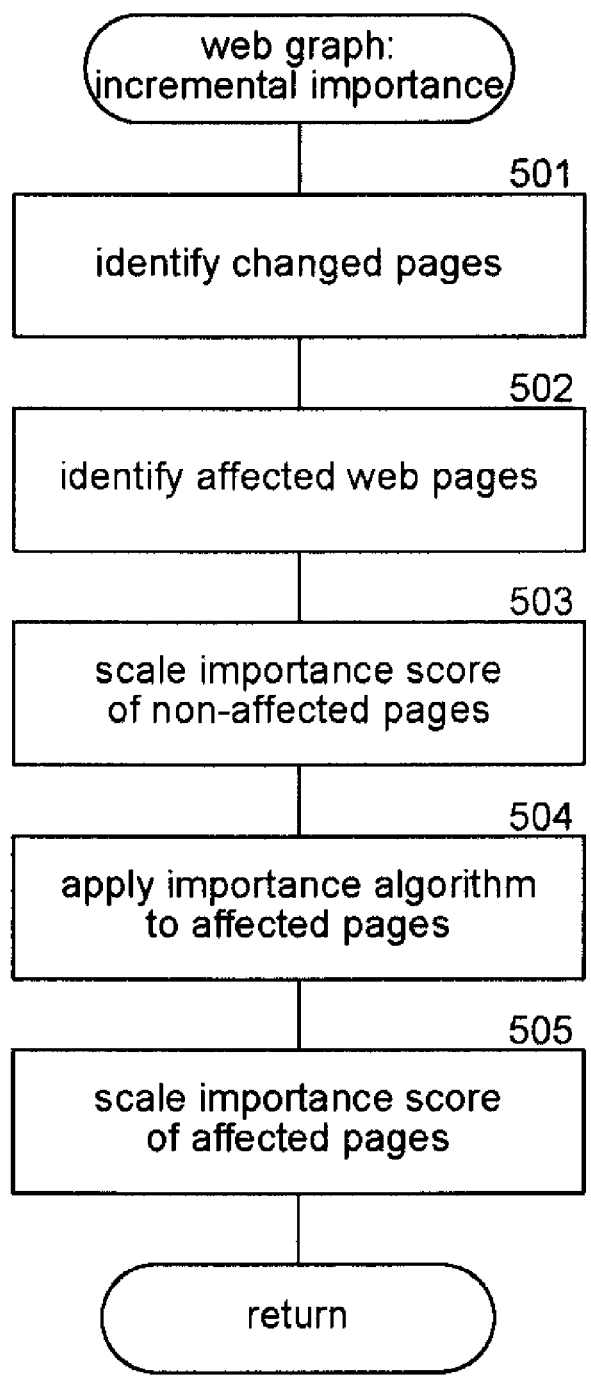
FIG. 5 is a flow diagram that illustrates the processing of the incremental importance component of the test system in one embodiment.

FIG. 5 is a flow diagram that illustrates the processing of the incremental importance component of the test system in one embodiment. The component generates new importance scores for the auxiliary importance list. In block 501, the component identifies the web pages that have changed by analyzing the auxiliary web graph and the original web graph. In block 502, the component identifies the affected web pages, which include web pages that have changed and web pages that are reachable from those web pages by following links. In block 503, the component scales the importance scores of the non-affected web pages. For example, the component may multiply the importance scores by the fraction of all the web pages that are not reachable. In block 504, the component applies the importance algorithm (e.g., a PageRank-type algorithm) to the affected web pages to generate new importance scores. In block 505, the component scales the importance of the affected web pages and then completes. For example, the component may multiply the importance scores by the fraction of all the web pages that are reachable.

Figure 6:
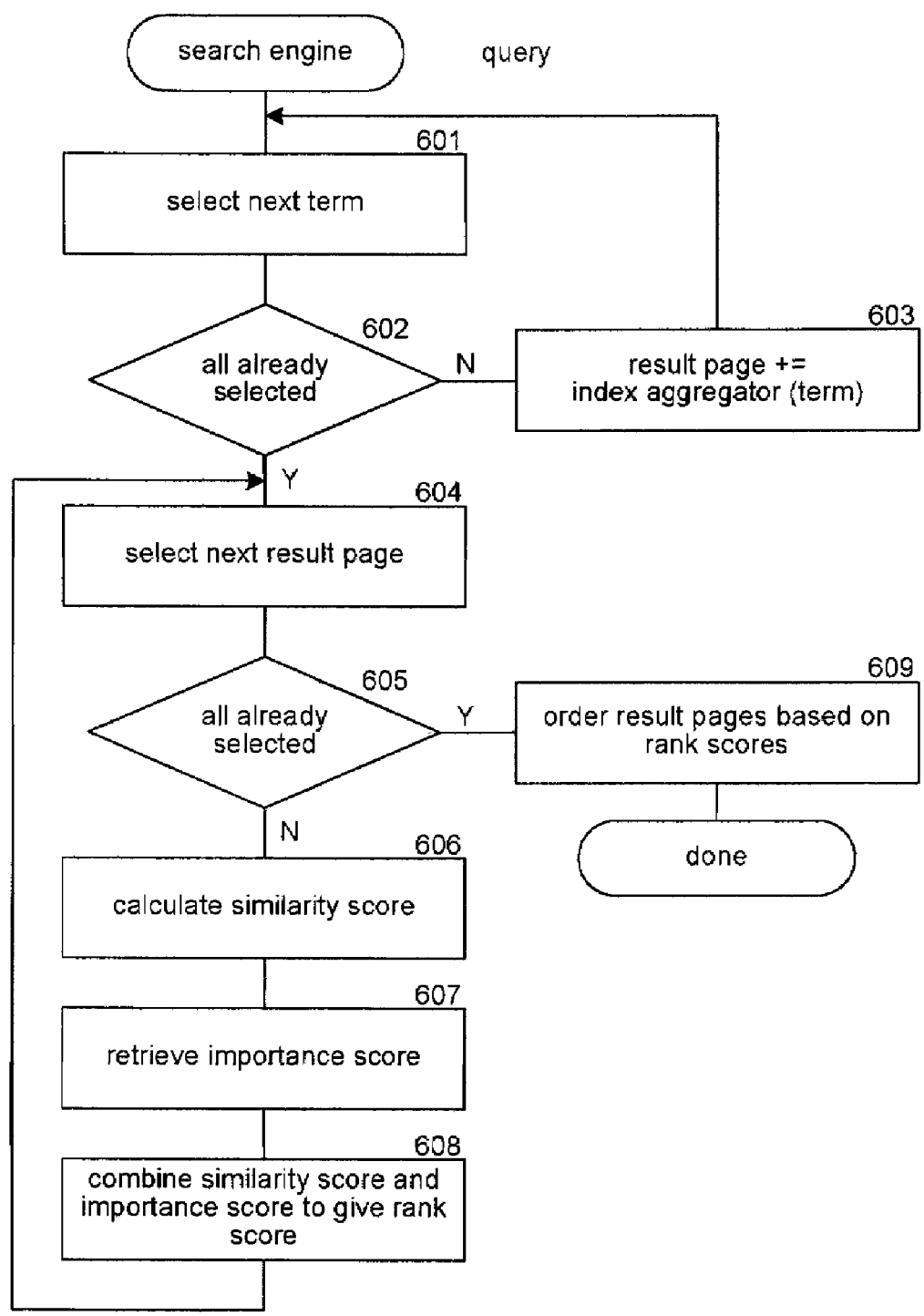
FIG. 6 is a flow diagram that illustrates the processing of the search engine component in test mode in one embodiment.

FIG. 6 is a flow diagram that illustrates the processing of the search engine component in test mode in one embodiment. The component is passed a query and returns the search results for the query. In blocks 601-603, the component loops identifying pages that are relevant to each term of the query. In block 601, the component selects the next term of the query. In decision block 602, if all the terms have already been selected, then the component continues at block 604, else the component continues at block 603. In block 603, the component invokes the index aggregator component passing the term to identify web pages relevant to the selected term. The component then adds those pages to the result pages and then loops to block 601 to select the next term. In blocks 604-608, the component loops calculating a rank score for each result page. In block 604, the component selects the next result page. In decision block 605, if all the result pages have already been selected, then the component continues at block 609, else the component continues at block 606. In block 606, the component calculates a similarity score indicating the similarity of the selected web page to the query. In block 607, the component retrieves the importance score for the selected web page from the auxiliary importance list. In block 608, the component combines the similarity score and the importance score to give an overall rank score for the selected web page. The component then loops to block 604 to select the next result page. In block 609, the component orders the result pages based on the rank scores and then completes. One skilled in the art will appreciate that various algorithms can be used to calculate a rank score. For example, the algorithm may factor in popularity of a web page that is derived from web logs. The algorithm may also weight the similarity score and the importance score in a linear or non-linear manner.

Figure 7:
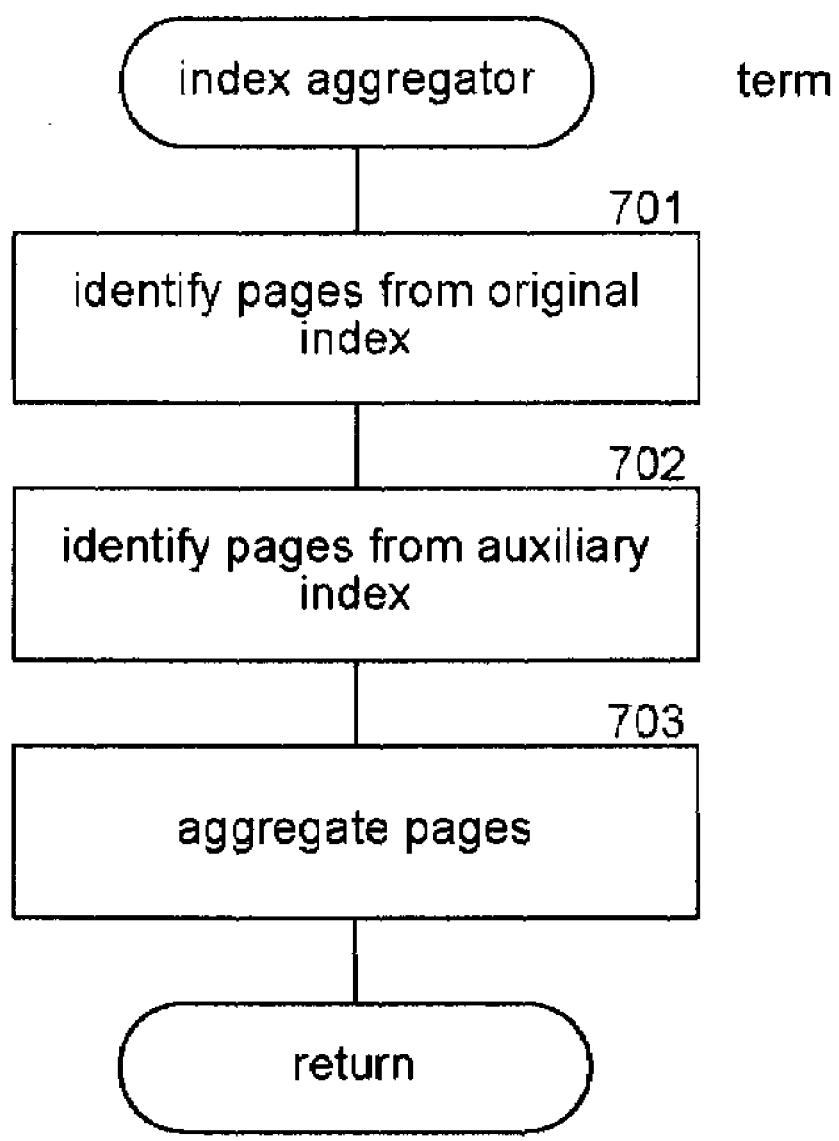
FIG. 7 is a flow diagram that illustrates the processing of the index aggregator component of the test system in one embodiment.

FIG. 7 is a flow diagram that illustrates the processing of the index aggregator component of the test system in one embodiment. The component is passed a term and identifies the web pages that are relevant to that term based on the original index and the auxiliary index. In block 701, the component identifies the relevant pages from the original index. In block 702, the component identifies the relevant pages from the auxiliary index. In block 703, the component aggregates the pages and returns the aggregated pages.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computing device having a memory and a processor for introducing spam into a search engine for testing purposes without affecting the search engine for non-testing purposes, the method comprising:
    providing an original data structure of the search engine, the original data structure including an original index of an original web graph;
    prior to receiving any query for testing purposes, receiving from a tester a specification of spam to be introduced into the data structure of the search engine, wherein the specification of spam received from the tester is used to generate search results in response to a query, and the specification of spam indicating an auxiliary web graph;
    generating an auxiliary data structure that represents the specified spam, the auxiliary data structure including an auxiliary index of the auxiliary web graph and after generating the auxiliary data structure,
    receiving a query for testing purposes, and
    generating search results for the received query based on an aggregation of information of the original data structure and the auxiliary data structure, wherein the search results are affected by the introduced spam without introducing spam into the original data structure and
    wherein the providing and generating are performed by the processor executing instructions stored in the memory.

2. The method of claim 1 wherein the original data structure is a term index that maps terms to pages.

3. The method of claim 2 wherein the introduced spam is content spam.

4. The method of claim 1 wherein the original data structure includes a web graph and an importance score list for the pages.

5. The method of claim 4 wherein the introduced spam is link spam.

6. The method of claim 5 including recalculating page importance using an incremental importance calculation technique.

7. The method of claim 1 wherein the specification of spam to be introduced is provided by a script.

8. The method of claim 6 including providing a library of specifications of spam to be used by testers developing scripts.

9. The method of claim 1 including evaluating the generated search results to determine whether the search engine effectively counters the introduced spam.

10. A computer-readable storage medium encoded with instructions for controlling a computing device to introduce spam into a search engine for testing purposes without affecting the search engine for non-testing purposes, the encoded instructions executed by a processor to perform a method comprising:
    providing an original data structure of the search engine, the original data structure including an original index of an original web graph;
    prior to receiving any query for testing purposes, receiving from a tester a specification of spam to be introduced into the data structure of the search engine, wherein the specification of spam received from the tester is used to generate search results in response to a query, and the specification of spam indicating an auxiliary web graph;
    generating an auxiliary data structure that represents the specified spam, the auxiliary data structure including an auxiliary index of the auxiliary web graph and after generating the auxiliary data structure,
    receiving a query for testing purposes; and
    generating search results for the received query based on an aggregation of information of the original data structure and the auxiliary data structure,
    wherein the search results are affected by the introduced spam without introducing spam into the original data structure.

11. The computer-readable storage medium of claim 10 wherein the original information is a mapping of terms to pages and the introduced spam is content spam.

12. The computer-readable storage medium of claim 10 wherein the original information is a web graph and importance scores for the pages and the introduced spam is link spam.

* * * * *